United States Patent
Paladi et al.

(10) Patent No.: US 12,483,539 B2
(45) Date of Patent: Nov. 25, 2025

(54) PROTOCOL TRANSLATION FOR ENCRYPTED DATA TRAFFIC

(71) Applicant: Canary Bit AB, Sollentuna (SE)

(72) Inventors: Nicolae Paladi, Sollentuna (SE); Pegah Nikbakht Bideh, Lund (SE)

(73) Assignee: Canary Bit AB, Sollentuna (SE)

( * ) Notice: Subject to any disclaimer, the term of this patent is extended or adjusted under 35 U.S.C. 154(b) by 140 days.

(21) Appl. No.: 18/564,006

(22) PCT Filed: May 25, 2021

(86) PCT No.: PCT/SE2021/050491
§ 371 (c)(1),
(2) Date: Nov. 24, 2023

(87) PCT Pub. No.: WO2022/250585
PCT Pub. Date: Dec. 1, 2022

(65) Prior Publication Data
US 2024/0275768 A1 Aug. 15, 2024

(51) Int. Cl.
*H04L 9/40* (2022.01)
(52) U.S. Cl.
CPC .............. *H04L 63/0464* (2013.01)
(58) Field of Classification Search
CPC .................................. H04L 63/0464
USPC ....................................... 713/160
See application file for complete search history.

(56) References Cited

U.S. PATENT DOCUMENTS

| | | | |
|---|---|---|---|
| 2008/0247541 A1 | 10/2008 | Cholas et al. | |
| 2014/0066015 A1* | 3/2014 | Aissi | H04W 4/60 455/411 |
| 2021/0111892 A1* | 4/2021 | Vahldiek-Oberwagner | G06F 21/57 |
| 2021/0397698 A1* | 12/2021 | Li | H04L 9/3263 |

FOREIGN PATENT DOCUMENTS

KR 20200084388 7/2020

OTHER PUBLICATIONS

International Search Report and Written Opinion Jan. 21, 2022.

* cited by examiner

*Primary Examiner* — Michael S McNally
(74) *Attorney, Agent, or Firm* — Michael P.F. Phelps; CM Law PLLC (57) ABSTRACT

A method of enabling communication protocol translation for encrypted data traffic between first and second devices. The method includes receiving data for the second device from the first device, creating a trusted execution environment ("TEE"), requesting attestation of the TEE from a trusted central device having access to a certificate authority ("CA") performing the attestation, receiving protocol translation instructions and cryptographic credentials required for securely communicating with the first and second devices, decrypting any encrypted data from the first device using the credentials, translating the decrypted data from a first protocol format utilized by the first device into a second protocol format utilized by the second device in the TEE based on the translation instructions, encrypting the translated data in the TEE using the received cryptographic credentials that allow the second device to decrypt the encrypted translated data, and sending the encrypted translated data to the second device.

19 Claims, 6 Drawing Sheets

PROTOCOL TRANSLATION FOR ENCRYPTED DATA TRAFFIC

This application is a U.S. National Stage of International Application No. PCT/SE2021/050491, filed on May 25, 2021.

TECHNICAL FIELD

The present disclosure relates to a method of a network device of enabling communication protocol translation of encrypted data traffic between a first device and a second device, and a network device performing the method.

BACKGROUND

Network communication in virtualized and cloud environments is commonly based on a model referred to as software-defined networking (SDN), allowing for management flexibility and efficient utilization or network resources.

Figure 1:
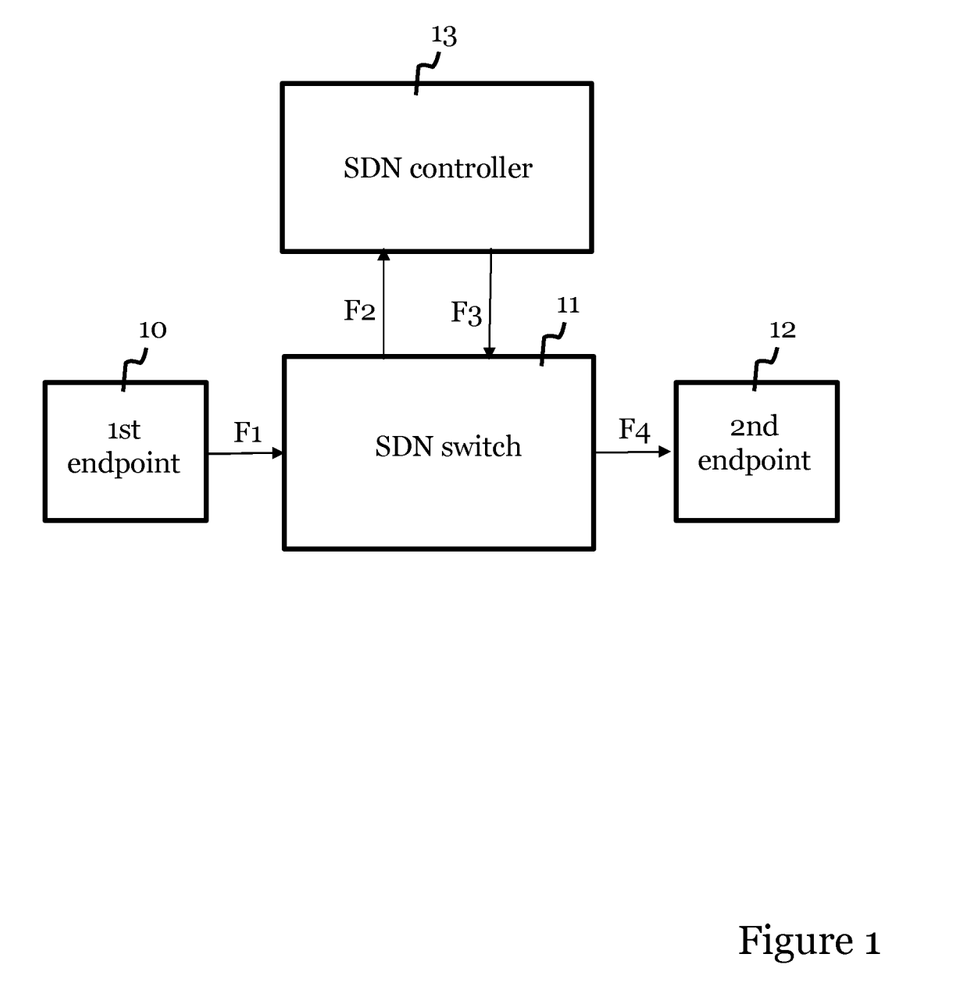
FIG. 1 illustrates a working principle of an SDN network, in which embodiments may be implemented.

In the SDN model, communication is organized in network flows between network endpoints 10, 12. As shown in FIG. 1, a flow—i.e. a sequence of data packets—may be established once a first network endpoint 10 initiates a network communication session and thus initiates a flow F1. Data plane network elements such as one or more SDN switches 11 located on a communication path between the two endpoints 10, 12 match incoming flows against flow rules contained in a flow table and handle the packets accordingly. For instance, the SDN switch 11 may conclude from the flow table that flow F1 is to be forwarded to the second network endpoint 12 and thus create flow F4 comprising the data packets of flow F1.

Unmatched packets may be dropped or sent (as F2) to an SDN controller 13, which may install a rule in the flow table of the SDN switch 11 with flow F3, thereby stipulating that the incoming flow F1 is to be forwarded to the second network endpoint 12 and the SDN switch 11 will create flow F4 accordingly.

Communication between network endpoints is commonly protected using suites for secure communication, such as Transport Layer Security (TLS) and Datagram Transport Layer Security (DTLS). To implement such protocols, the network endpoints 10, 12 require cryptographic keys, i.e. either shared symmetric keys or public/private key pairs and digital certificates.

Further, network endpoints may use a variety of application layer protocols to communicate. Examples of such protocols include CoAP (constrained application protocol), MQTT (message queueing telemetry transport), AMQP (advanced message queuing protocol), XMPP (extensive messaging and presence protocol), among others. Such application layer protocols are not mutually compatible or interoperable. Two approaches commonly exist in order to achieve interoperability between endpoints that communicate using different application layer protocols.

Figure 2A:
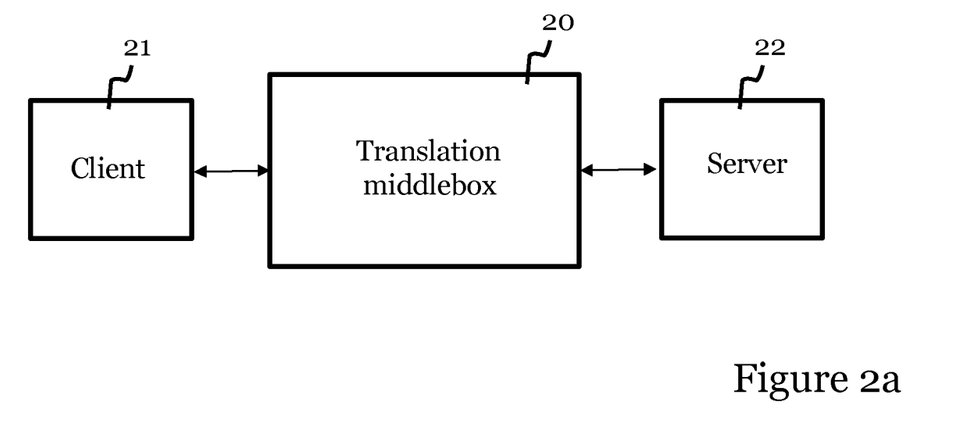
FIGS. 2a and 2b illustrate a client and a server communication utilizing different application layer protocols.

In a first approach illustrated in FIG. 2a, a hardware or software network component 20 (a "middlebox") implements the logic of translating packets between two or more incompatible application layer protocols, in this example a first protocol utilized by client 21 and a second protocol utilized by server 22. While this approach allows in-line protocol translation at a high data rate, it cannot handle secure network communication, for example network communication over TLS or DTLS; instead, it transmits the packets in plaintext.

Figure 2B:
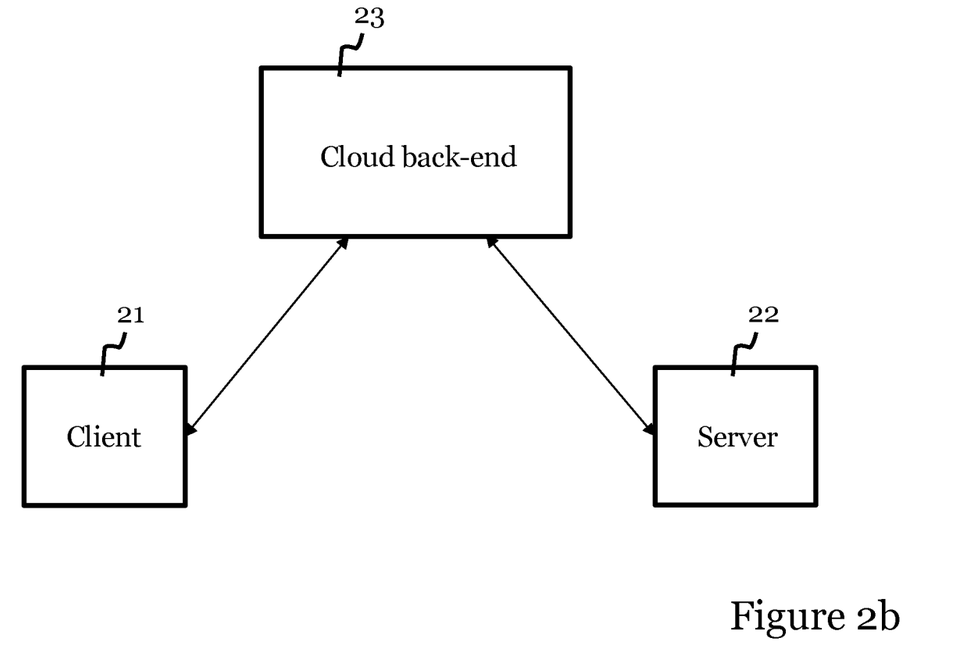

In a second approach illustrated in FIG. 2b, all traffic is forwarded to a cloud back-end 23, where the secure communication is terminated. The cloud back-end 23 translates the incoming network packets from the client 21 to the destination protocol of the server 22 and forwards the packets over a new secure channel. While this approach allows support for secure communication between the endpoints (such as TLS or DTLS), a significant communication delay is introduced. Furthermore, this introduces a single point of failure; in case the translation component in the cloud back-end 23 is compromised and cryptographic keys are attained, an adversary may gain access to all communication flows between all endpoints.

SUMMARY

One objective is to solve, or at least mitigate, these problems and provide a method of a network device for enabling communication protocol translation of encrypted data traffic between a first device and a second device.

This objective is attained in a first aspect by a method of a network device of enabling communication protocol translation for encrypted data traffic between a first device and a second device. The method comprises receiving, from the first device, data intended for the second device, triggering creation of a trusted execution environment (TEE), and requesting attestation of the created TEE from a trusted central device having access to a certificate authority (CA) performing the attestation. Further, the method comprises receiving, over a secure communication channel established with the trusted central device upon successful attestation, protocol translation instructions and cryptographic credentials required for securely communicating with the first device and the second device and decrypting, in the TEE, any received encrypted data from the first device using the received cryptographic credentials, translating the decrypted data from a first protocol format utilized by the first device into a second protocol format utilized by the second device in the TEE based on the received translation instructions, and encrypting the translated data in the TEE using the received cryptographic credentials, the credentials being configured to allow the second device to decrypt the encrypted translated data. Finally, the encrypted translated data is sent to the second device.

This objective is attained in a second aspect by a network device configured to enable communication protocol translation of encrypted data traffic between a first device and a second device. The network device comprises a processing unit and a memory containing instructions executable by the processing unit, whereby the network device is operative to receive, from the first device, data intended for the second device, trigger creation of a TEE, to request attestation of the created TEE from a trusted central device having access to a certificate authority (CA) performing the attestation, and to receive, over a secure communication channel established with the trusted central device upon successful attestation, protocol translation instructions and cryptographic credentials required for securely communicating with the first device and the second device. The network device is further operative to decrypt, in the TEE, any received encrypted data from the first device using the received cryptographic credentials, translate the decrypted data from a first protocol format utilized by the first device into a second protocol format utilized by the second device in the TEE based on the received translation instructions, and to encrypt the translated data in the TEE using the received cryptographic credentials, the credentials being configured to allow the second device to decrypt the encrypted translated data. Moreover, the network device is operative to send the encrypted translated data to the second device.

Thus, by creating a TEE being attested by a CA, in which TEE encrypted received data securely is decrypted, translated into a protocol format interpretable by an intended receiver, and finally re-encrypted before being sent to the intended receiver being able to decrypt the re-encrypted data, a number of advantages are obtained over approaches utilized in the art.

Scalability—as the number of data traffic flows increases in the network, a separate TEE can be created for each flow to provide protocol translation, such that translation logic/instructions and/or cryptographic credentials are separate for each flow. With this solution, the actual protocol translation process is not performed at a central node, neither is a bottleneck caused (in the form of one specific network middlebox for protocol translation, or hardware protocol translation element).

Robustness—the protocol translation can be performed in different switches/TEEs, thus avoiding the introduction of a single point of failure. For example, in case a certain network path is not available, a new TEE may be created for the specific network flow on a different network path.

Low latency for secure communication—the protocol translation process maintains a low latency while supporting secure communication between endpoints. In particular, network communication does not need to be re-routed to a cloud back-end to perform TLS termination and protocol translation before being sent over a secure TLS channel.

Transparency—the protocol translation process is transparent to the endpoints as they do not need to be involved in the translation process.

Security—the solution enables communication over a secure channel (such as (D)TLS) between endpoints that use different network communication protocols. In order to conduct protocol translation in a secure manner, the solution enables interception of (D)TLS traffic in a secure TEE. Thus, while the solution is agnostic to the actual approach to (D)TLS interception (e.g. through trusted certificates, key shares, or any other means), it uses integrity attestation of the TEEs to ensure that cryptographic credentials for protocol conversion is provisioned to and used in a secure environment.

Resource efficiency—TEEs are created on-demand in response to a translation action in the switch, triggered whenever communication over a secure channel occurs between two endpoints that use different network protocols. The lifetime of the TEE can be limited to the lifetime of the network communication flow between the respective endpoints (which further is advantageous in terms of security since a malicious attempt to extract credentials from the TEE will not be possible after the TEE has been terminated). This enables secure ad-hoc communication between endpoints that use different network protocols while using only a minimum of network and computational resources.

In an embodiment, the network device is configured to identify the second device as an intended receiver of the data and any rules associated with sending the data to the second device.

In an embodiment, the network device is configured to forward said data received from the first device to the second device.

In an embodiment, the network device is configured to receive and forward data received from the second device to the first device in order to enable handshaking between the first device and the second device.

In an embodiment, the network device is configured to, when triggering the creation of the TEE, creating the TEE at the network device.

In an embodiment, the network device is configured to, when triggering the creation of the TEE, requesting the trusted central device to create the TEE.

In an embodiment, the network device is configured to terminate the TEE upon sending the encrypted translated data to the second device.

In an embodiment, the network device is configured to terminate the TEE after a pre-set termination timer has expired after sending the encrypted translated data to the second device.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 3:
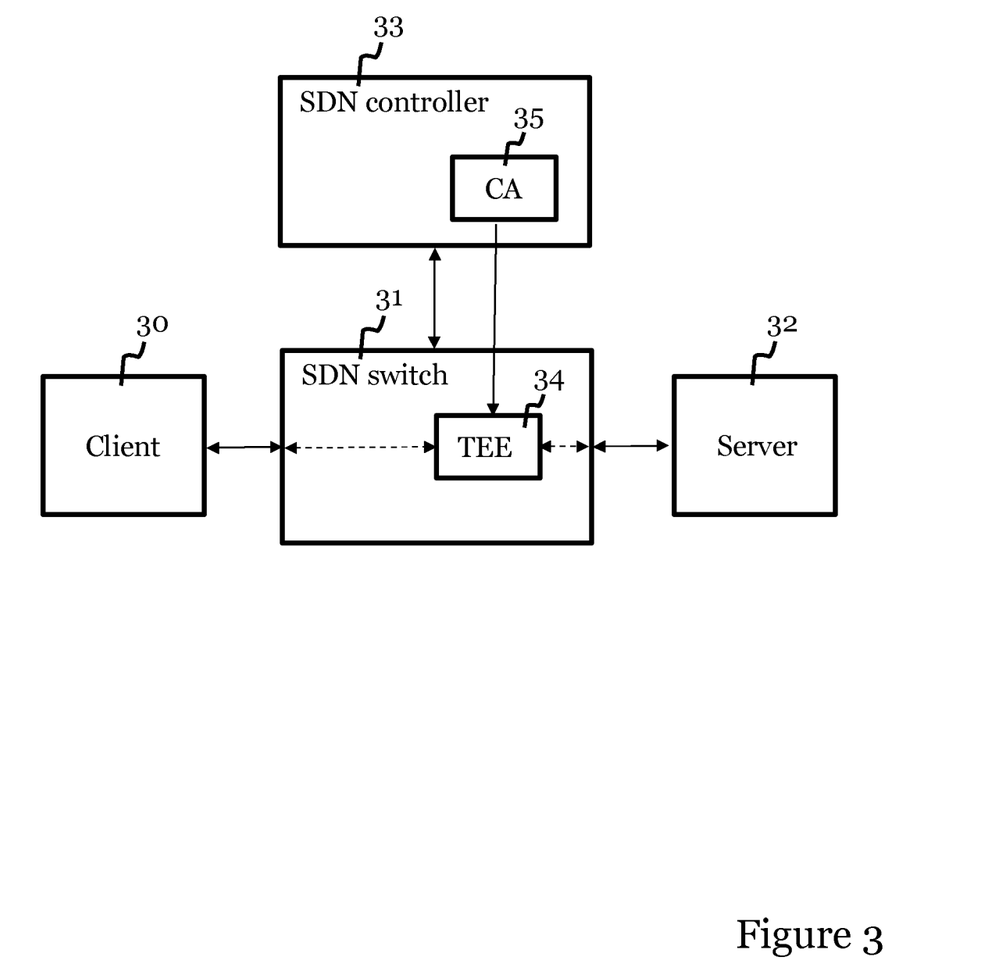
FIG. 3 illustrates an SDN switch according to an embodiment.

FIG. 3 illustrates an SDN in which a method of enabling protocol translation for encrypted data traffic is implemented according to an embodiment.

A client 30 transmits and receives data over the SDN using any appropriate application layer protocol, for instance CoAP. The data is communicated over an SDN switch 31 to a server 32 using an application layer protocol being different from the protocol used by the client 30, for instance MQTT. Further illustrated is an SDN controller 33 to be discussed in more detail in the following.

As is understood, since two endpoints—i.e. the client 30 and the server 32—utilizes different communication protocols, a protocol translation is required for the two endpoints to be able to communicate with each other.

Further, if secure communication is required, the data traffic between the client 30 and the server 32 must be encrypted, which further must taken into account upon performing protocol translation. As discussed hereinabove, this is problematic.

Figure 4:
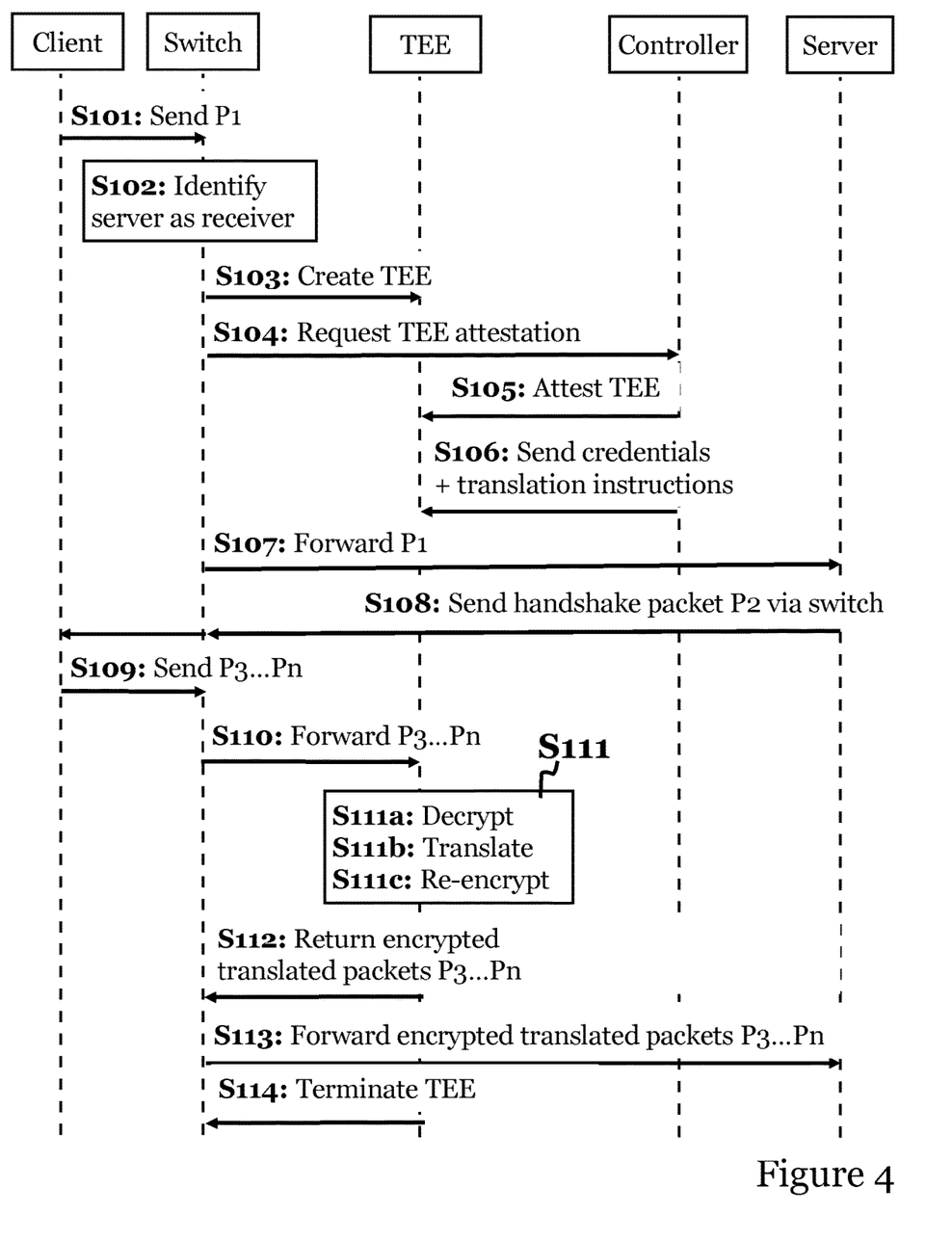
FIG. 4 shows a signalling diagram illustrating a method according to an embodiment implemented in the SDN of FIG. 3.

FIG. 4 shows a flowchart illustrating the method of enabling protocol translation for encrypted data traffic according to an embodiment.

In a first step S101, the client 30 sends to the SDN switch 31 at least one data packet P1 in plaintext intended for the server 32 in order to establish a transport layer connection, using for instance User Datagram Protocol (UDP) or Transmission Control Protocol (TCP) as communication protocol.

In this exemplifying embodiment, upon the SDN switch 31 receiving the packet P1, the switch 31 concludes in step S102 that the packet P1 matches a rule in its flow table and that the packet P1 in accordance with the matching rule is to be forwarded to the server 32. In case another type of network than SDN is being used, it may alternatively be envisaged that a header of the packet P1 indicates its destination, i.e. the server 32, to a device being used is an alternative to the SDN switch 31.

In step S103, the SDN switch 31 triggers creation of an instance of a trusted execution environment 34 (TEE). The TEE 34 is a secure processing area, which in this embodiment is located within the SDN switch 31, where data being loaded into the area is protected with respect to confidentiality and integrity. The TEE 34 is created for communication between these very two endpoints, i.e. the client 30 and the server 32. If the client subsequently initiates a communication with another device, a new dedicated TEE will be created by the SDN switch 31 for communication between the client 30 and said another device. It should be noted that the creation of the TEE 34 is "triggered" in the sense that the SDN switch 31 itself may create the TEE 34, or alternatively turn e.g. to the SDN controller 33 for creation of the TEE 34.

As can be seen, the TEE 34 is created when the SDN switch 31 receives the first packet P1 from the client 30 intended for the server 32, before a secure communication channel is established between the SDN switch 31 and the client 30 and the server 32, respectively. This advantageously avoids processing delays as compared to creating the TEE 34 at a later point when the secure channel has already been established.

In this particular embodiment, the TEE 34 is instantiated within the SDN switch 31, but may alternatively be instantiated as a stand-alone entity.

Thereafter, the SDN switch 31 sends a request in step S104 to a trusted central device having access to a certificate authority 35 (CA), the trusted central device in this example being embodied by the SDN controller 33, to perform attestation of the created TEE 34 which is designated for communication between the client 30 and the server 32. As is understood, the CA 35 is trusted by all involved parties, i.e. the client 30, the SDN switch 31 and the server 32. In this example, the trusted central device, i.e. the SDN controller 33, hosts the CA 35, but the CA 35 may alternatively 35 be an entity external from the SDN controller 33.

Attestation may be performed in numerous ways and serves to authenticate the TEE 34 to other entities—in this case the client 30 and the server 32—thereby allowing the client 30 and the server 32 to remotely verify the integrity of the TTE 34. Typically, each manufacturer of hardware uses its own attestation approach, such as Intel Software Guard Extensions (SGX), AMD Secure Encrypted Virtualization (SEV), IBM Protected Execution Facility (PEF), Amazon Web Services (AWS) Nitro Enclaves, etc.

In one embodiment, the SDN controller 33 performs attestation of the TEE 34 in step S105 by issuing a certificate to the TEE 34 via the CA 35. In brief, the issued certificate of the CA 35 of the SDN controller 33 certifies TEE ownership of a public key and allows other parties to rely upon signatures created with a private key that corresponds to the certified public key.

Assuming that the attestation if successful in step S105, the SDN controller 33 sends in step S106 to the TEE, over an established secure channel:

(i) network packet translation instructions for enabling translation of data between application layer protocols, in this example between CoAP and MQTT, and vice versa; and (ii) cryptographic credentials (received by the SDN controller 33 from the CA 35) required to decrypt and encrypt data communicated between the client 30 and the server 32, for instance a symmetric encryption/decryption key to be shared or a pair of asymmetric keys or other appropriate credentials such as shared secret for creating encryption/decryption keys in order to be able to establish secure communication channels between the client 30 and the SDN switch 31 on the one hand and between the SDN switch 31 and the server 32 on the other.

As is understood, the SDN controller 33 (which in this example also hosts a trusted CA 35) in the network has access to information identifying the protocols utilized by the client 30 and the server 32, respectively, as well as any cryptographic keys required to communicate securely with the client 30 and the server 32.

In an SDN network, the SDN controller 33 is responsible for configuring the SDN switches (for example, configuring rules regarding protocol translation). The SDN controller 33 may have one or more applications (or extensions), which provide other network services; a typical example of such an application is traffic measurement and traffic analysis performed based on data collected by the SDN controller 33 from all the switches that it controls. Further, the CA 35 may be one of the applications or extensions of the SDN controller 33, signing and managing public key infrastructure (PKI) certificates, as well as providing other typical CA functionality.

Likewise, the SDN controller 33 may be configured with a dedicated application/extension that implements the functionality to perform the attestation of the TEE 34 (i.e. a verifier). Once the attestation is performed, the verifier requests from the CA 35 the necessary cryptographic material and deploys them to the TEE 34.

In step S107, in a scenario where a handshake procedure is performed between the client 30 and the server 32 at the transport layer before any data is sent over the application layer, the SDN switch 31 forwards the packet P1 to the server 32 in accordance with the rule of the flow table for which a match previously occurred. Preferably, in order to avoid network delay, packet P1 is forwarded to the server 32 simultaneously as the creation of the TEE 34 in S103. That is, steps S103 and S107 are preferably performed in parallel.

In response to packet P1 received from the SDN switch 31, the server 32 sends a handshake packet P2 to the client 30 in step S108 via the SDN switch 31, wherein communication between the client 30 and the server 32 has been established. In practice, further packets may be exchanged (in addition to P1 and P2) between the client 30 and the server 32 at the transport layer before an application layer connection is established.

Thereafter, in step S109, the client 30 sends one or more encrypted data packets P3, . . . , Pn to the SDN switch 31 in order to establish an application layer connection, which packets are intended for the server 32.

The SDN switch 31 receives the encrypted data packets P3, . . . , Pn and forwards the packets to the TEE 34 in step S110 for further processing as illustrated in step S111.

The processing in step S111 includes the TEE 34 decrypting the packets P3, . . . , Pn in step S111a, e.g. with a symmetric key shared with the client 30 or with a private key included in a key pair comprising a public key with which the packets were encrypted at the client 30. These required keys, or any cryptographic credentials from which these required keys can be derived or created, was previously provided to the TEE 34 by the SDN controller 33 as described hereinabove in connection to step S106.

Thus, after step S111a, the data packets P3, . . . , Pn are in plaintext inside the secure environment of the TEE 34.

In step S111b, the TEE 34 utilizes the previously received network packet translation instructions to translate the packets P3, . . . , Pn transmitted using CoAP as application layer protocol into packets complying with MQTT. In other words, the data packets P3, . . . , Pn that were sent by the client 30 using a CoAP message format have now been converted to comply with the MQTT message format in order for the server 32 to be able to interpret the data comprised in the packets P3, . . . , Pn.

In order to maintain the security level in the SDN, the data packets P3, . . . , Pn which are now in plaintext and comply with the MQTT protocol format are re-encrypted in step S111c inside the TEE 34 using an encryption key, or cryptographic material from which said encryption key can be derived or created, received from the SDN controller 33 in step S106. In other words, the MQTT plaintext data packets P3, . . . , Pn are re-encrypted with an encryption key for which the server 32 holds a corresponding decryption key.

The processing of the received encrypted CoAP packets P3, . . . , Pn inside the TEE 34 is thus completed and the resulting encrypted MQTT packets are provided to the SDN switch 31 in step S112, thereby transferring the packets outside of the secure environment provided by the TEE 34.

The process of decrypting the encrypted packets inside the TEE 34 and thereafter re-encrypting any translated packets is commonly referred to as TLS interception, while the communication between endpoints—i.e. the client 30 and the server 32—via the SDN switch 31 is referred to as TLS communication.

In step S113, the encrypted MQTT data packets P3, . . . , Pn (belonging to the same flow of packets P1 received in step S101 and thus have already been matched to a rule in the SDN switch flow table) are forwarded to the server 32 which typically will use the appropriate decryption key (being based on the credentials provided to the TEE 34 in step S106) to produce a plaintext version of the data packets P3, . . . , Pn, which are now in the required MQTT format.

Optionally, in step S114, the SDN switch 31 will terminate the TEE 34 even though it may be envisaged that the SDN switch 31 will await further data to be communicated between the client 30 and the server 32 (i.e. from the client 30 to the server 32 or from the server 32 to the client 30). Alternatively, the TEE 34 is terminated after a set termination timer has expired, or after the SDN switch 31 receives an external termination command for the TEE 34, for example from the SDN controller 33.

This embodiment provides a number of advantages over the prior art. Firstly, secure and fast in-line protocol translation of encrypted network traffic is enabled. Secondly, communication between devices using different application layer protocols is enabled while maintaining latency requirements. Thirdly, protocol translation of encrypted network traffic is enabled without creating a single point of failure. Fourthly, massive secure machine-to-machine communication may be attained by enabling a distributed protocol translation mechanism being able to dynamically adapt to new devices and network topologies, where a translation mechanism is created for each pair of endpoints being involved rather than providing a central back-end for all traffic as previously discussed with reference to FIG. 2b.

As illustrated in FIG. 3, the created TEE 34 is located inside the SDN switch 31, while the SDN controller 33 hosts an internal CA 35. Many alternative variants may be envisaged.

Figure 5A:
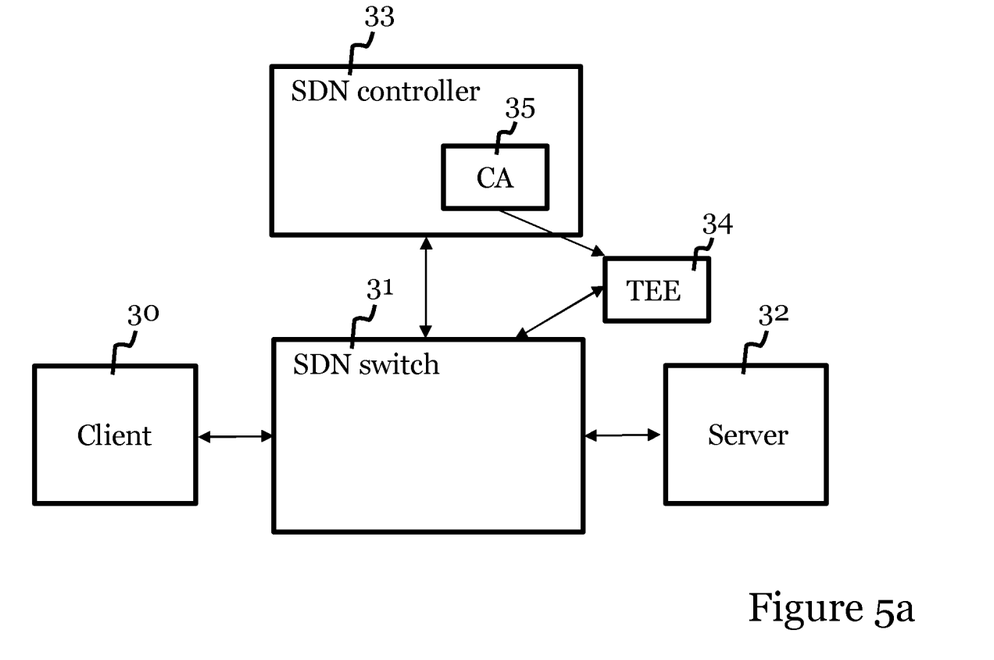
FIGS. 5a and 5b illustrate different network configurations according to embodiments.

As illustrated in FIG. 5a, the SDN switch 31 or the SDN controller 33 creates (S103) the TEE 34 as an external entity, separate from the switch 31, to which external TEE 34 the SDN switch 31 forwards (S110) encrypted packets in a first protocol format for decryption (S111a), translation into a second protocol format (S111b) and re-encryption (S111c) before the packets are returned (S112) to the SDN switch 31.

Figure 5B:
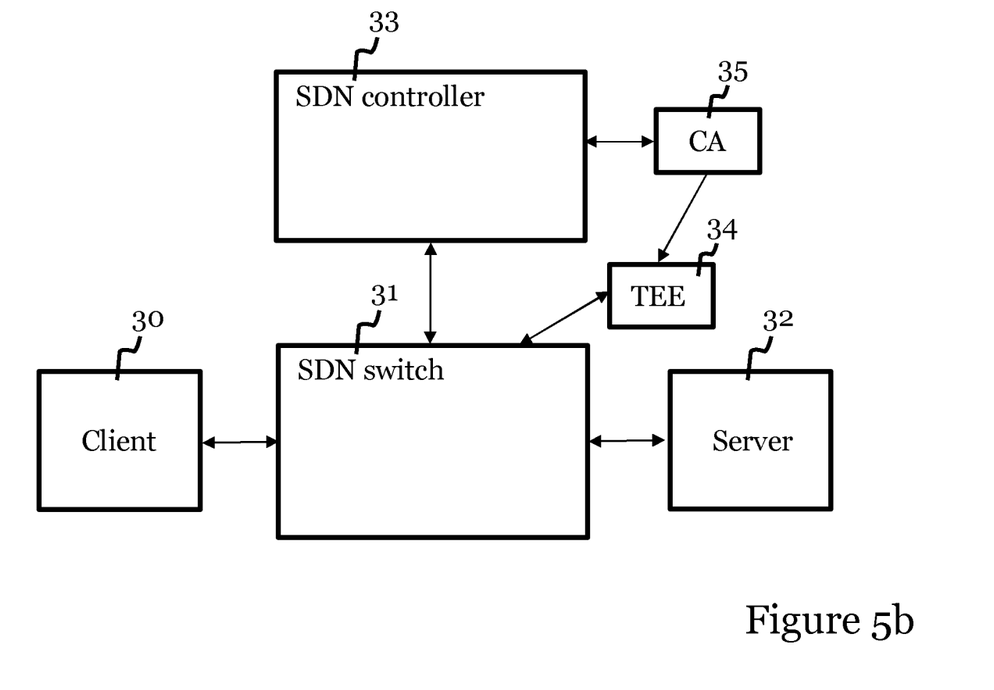

As illustrated in FIG. 5b, the SDN switch 31 or the SDN controller 33 creates (S103) the TEE 34 as an external entity, separate from the switch 31, to which external TEE 34 the SDN switch 31 forwards (S110) encrypted packets in a first protocol format for decryption (S111a), translation into a second protocol format (S111b) and re-encryption (S111c) before the packets are returned (S112) to the SDN switch 31.

In the configuration of FIG. 5b, the CA 35 is arranged externally from the SDN controller 33. Thus, upon successful attestation of the TEE 34, the external CA 35 will deliver the cryptographic credentials to the SDN controller 33 over a secure channel, and the SDN controller 33 will in its turn supply the received cryptographic credentials to the TEE 34 over yet another secure channel.

Figure 6:
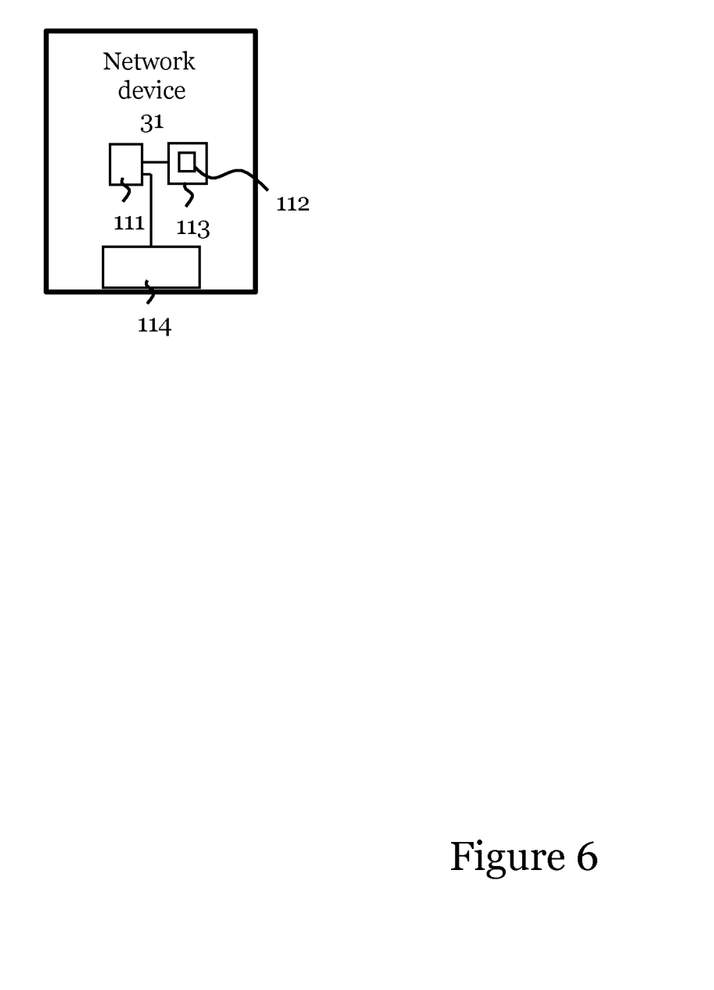
FIG. 6 illustrates a network device according to an embodiment.

FIG. 6 illustrates a network device 31 according to an embodiment, such as an SDN controller, where the steps of the method performed by the network device 31 in practice are performed by a processing unit 111 embodied in the form of one or more microprocessors arranged to execute a computer program 112 downloaded to a storage medium 113 associated with the microprocessor, such as a Random Access Memory (RAM), a Flash memory or a hard disk drive. The processing unit 111 is arranged to cause the network device 31 to carry out the method according to embodiments when the appropriate computer program 112 comprising computer-executable instructions is downloaded to the storage medium 113 and executed by the processing unit 111. The storage medium 113 may also be a computer program product comprising the computer program 112. Alternatively, the computer program 112 may be transferred to the storage medium 113 by means of a suitable computer program product, such as a Digital Versatile Disc (DVD) or a memory stick. As a further alternative, the computer program 112 may be downloaded to the storage medium 113 over a network. The processing unit 111 may alternatively be embodied in the form of a digital signal processor (DSP), an application specific integrated circuit (ASIC), a field-programmable gate array (FPGA), a complex programmable logic device (CPLD), etc. The network device 31 further comprises a communication interface 114 (wired or wireless) over which the network device 31 is configured to transmit and receive data.

The network device 31 of FIG. 6, being exemplified as an SDN controller, may be provided as a standalone device or as a part of at least one further device. For example, the network device 31 may be provided in a network node such as the SDN controller. Alternatively, functionality of the network device 31 may be distributed between at least two devices, or nodes.

Thus, a first portion of the instructions performed by the network device 31 may be executed in a first device, and a second portion of the of the instructions performed by the network device 31 may be executed in a second device; the herein disclosed embodiments are not limited to any particular number of devices on which the instructions performed by the network device 31 may be executed.

Hence, the methods according to the herein disclosed embodiments are suitable to be performed by a network device 31 residing in a cloud computational environment. Therefore, although a single processing circuitry 111 is illustrated in FIG. 6, the processing circuitry 111 may be distributed among a plurality of devices, or nodes. The same applies to the computer program 112. Embodiments may be entirely implemented in a virtualized environment.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a network device of enabling communication protocol translation for encrypted data traffic between a first device and a second device, the method comprising:
receiving, from the first device, data intended for the second device;
triggering creation of a trusted execution environment ("TEE");
requesting attestation of the created TEE from a trusted central device having access to a certificate authority ("CA"), performing the attestation;
receiving, over a secure communication channel established with the trusted central device upon successful attestation, protocol translation instructions and cryptographic credentials required for securely communicating with the first device and the second device;
decrypting, in the TEE, any received encrypted data from the first device using the received cryptographic credentials, translating the decrypted data from a first protocol format utilized by the first device into a second protocol format utilized by the second device in the TEE based on the received translation instructions, and encrypting the translated data in the TEE using the received cryptographic credentials, wherein the credentials are configured to allow the second device to decrypt the encrypted translated data; and
sending the encrypted translated data to the second device.

2. The method of claim 1, further comprising:
identifying the second device as an intended receiver of the data and any rules associated with sending the data to the second device.

3. The method of claim 1, further comprising:
forwarding said data received from the first device to the second device.

4. The method of claim 3, further comprising:
receiving and forwarding data received from the second device to the first device in order to enable handshaking between the first device and the second device.

5. The method of claim 1, wherein the triggering of the creation of the TEE comprises:
creating the TEE at the network device.

6. The method of claim 1, wherein the triggering of the creation of the TEE comprises:
requesting the trusted central device to create the TEE.

7. The method of claim 1, further comprising:
terminating the TEE upon sending the encrypted translated data to the second device.

8. The method of claim 7, further comprising:
terminating the TEE after a pre-set termination timer has expired after sending the encrypted translated data to the second device.

9. The method of claim 1, wherein the translation is performed from a first application layer protocol format to a second application layer protocol format.

10. A computer program comprising computer-executable instructions stored on a non-transitory computer-readable medium, wherein the computer-executable instructions, upon execution by a processing unit included in a network device, are configured to cause the network device to enable communication protocol translation for encrypted data traffic between a first device and a second device, by:
receiving, from the first device, data intended for the second device;
triggering creation of a trusted execution environment ("TEE");
requesting attestation of the created TEE from a trusted central device having access to a certificate authority ("CA"), performing the attestation;
receiving, over a secure communication channel established with the trusted central device upon successful attestation, protocol translation instructions and cryptographic credentials required for securely communicating with the first device and the second device;
decrypting, in the TEE, any received encrypted data from the first device using the received cryptographic credentials, translating the decrypted data from a first protocol format utilized by the first device into a second protocol format utilized by the second device in the TEE based on the received translation instructions, and encrypting the translated data in the TEE using the received cryptographic credentials, wherein the credentials are configured to allow the second device to decrypt the encrypted translated data; and
sending the encrypted translated data to the second device.

11. A network device configured to enable communication protocol translation of encrypted data traffic between a first device and a second device, said network device comprising a processing unit and a memory, said memory containing instructions executable by said processing unit, whereby the network device is operative to:
receive, from the first device, data intended for the second device;
trigger creation of a trusted execution environment ("TEE");

request attestation of the created TEE from a trusted central device having access to a certificate authority ("CA"), performing the attestation;

receive, over a secure communication channel established with the trusted central device upon successful attestation, protocol translation instructions and cryptographic credentials required for securely communicating with the first device and the second device;

decrypt, in the TEE, any received encrypted data from the first device using the received cryptographic credentials, translate the decrypted data from a first protocol format utilized by the first device into a second protocol format utilized by the second device in the TEE based on the received translation instructions, and encrypt the translated data in the TEE using the received cryptographic credentials, wherein the credentials are configured to allow the second device to decrypt the encrypted translated data; and send the encrypted translated data to the second device.

12. The network device of claim 11, further being operative to:

identify the second device as an intended receiver of the data and any rules associated with sending the data to the second device.

13. The network device of claim 11, further being operative to:

forward said data received from the first device to the second device.

14. The network device of claim 13, further being operative to:

receive and forward data from the second device to the first device in order to enable handshaking between the first device and the second device.

15. The network device of claim 11, further being operative to, when triggering the creation of the TEE:

create the TEE at the network device.

16. The network device of claim 11, further being operative to, when triggering the creation of the TEE:

request the trusted central device to create the TEE.

17. The network device of claim 11, further being operative to:

terminate the TEE upon sending the encrypted translated data to the second device.

18. The network device of claim 17, further being operative to:

terminate the TEE after a pre-set termination timer has expired after sending the encrypted translated data to the second device.

19. The network device of claim 11, wherein the translation is performed from a first application layer protocol format to a second application layer protocol format.

* * * * *